Feb. 26, 1974  G. E. KAYE  3,794,525
BATTERY ASSEMBLY
Filed April 12, 1972  4 Sheets-Sheet 2

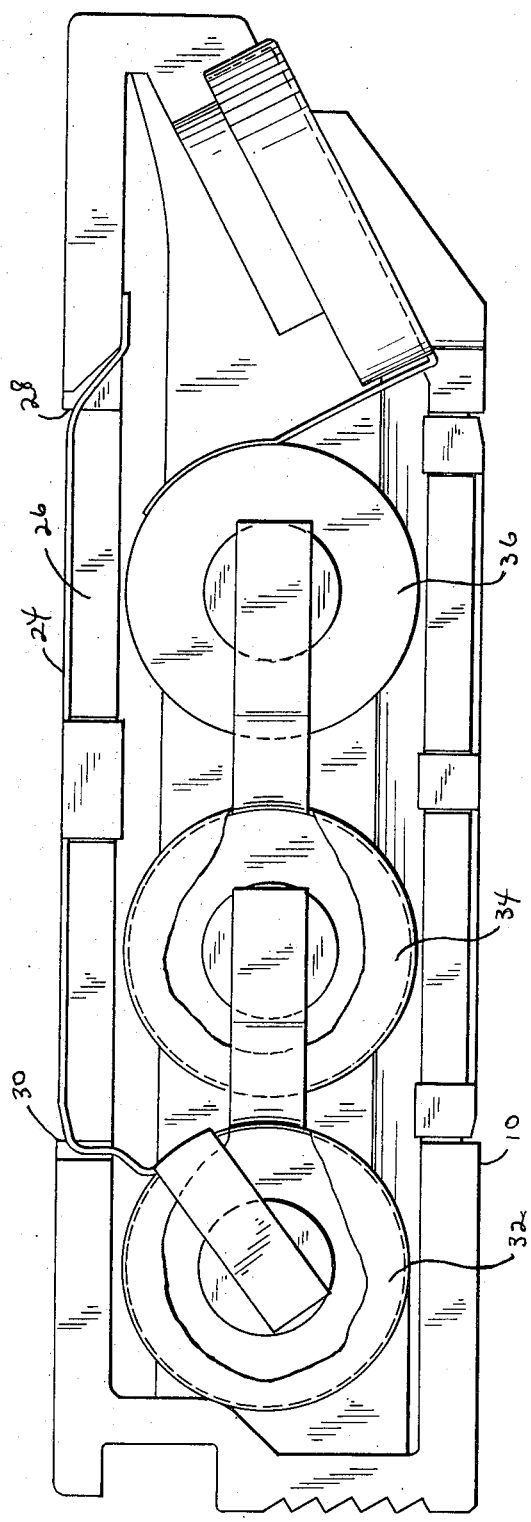

Feb. 26, 1974   G. E. KAYE   3,794,525

BATTERY ASSEMBLY

Filed April 12, 1972   4 Sheets-Sheet 4

United States Patent Office 3,794,525
Patented Feb. 26, 1974

3,794,525
BATTERY ASSEMBLY
Gordon E. Kaye, 140 N. Broadway,
Irvington, N.Y. 10533
Filed Apr. 12, 1972, Ser. No. 243,387
Int. Cl. H01m 1/02
U.S. Cl. 136—108   1 Claim

ABSTRACT OF THE DISCLOSURE

A two-part molded cartridge utilizes one part as an assembly tray or shell for assembling one or more electric cells in position to permit electrical interconnections between the cells, and to support contact terminal surfaces for connection to external circuit contact terminals, and then utilizes the second molded part as a cover, and the two parts are then sealed to constitute a housing for the cells as a battery unit.

DESCRIPTION

This invention relates to a packaged battery consisting of plurality of small unitary cells disposed in a molded cartridge as a housing for the cells, to serve as a unit to be readily loaded into the space of a receiving compartment of corresponding size so the cartridge may be inserted into the space to engage suitable contact elements in the space to connect the battery into an external circuit.

There are many applications in which it is desirable to have a battery available as a cartridge, without the need of manipulatable connections or electrical terminals beyond the engagement of suitable surface terminals on the cartridge engaging correspondingly placed surface terminals in the space to be occupied by the battery cartridge. One such application is a camera in which the battery is employed in a system to provide a sharp electrical pulse of current for energizing a flash tube.

The usual problem with any such application is to fit the battery cartridge into a space that is already limited by the dimensions of a closely packed structure either of the camera or of some other device which is usually designed to a minimum limiting dimension sufficiently adequate merely to accomplish the functions of the device itself, such as the indicated camera.

A feature of the present invention is that the molded cartridge, which is to serve as the housing for the battery cells, is formed in two parts, so that the cells may be disposed and supported in one part of the housing in a manner to permit properly electrically connecting them to each other, as a preliminary step in the manufacturing assembly, thereby permitting the use of the molded cartridge as an assembling and holding tray for the electric cells during the manufacturing assembly, and, then permitting the two molded cartridge halves to be joined as a final enclosing housing for the cells.

Such utilization of the molded cartridge halves, for assembling and holding the cells in place during the manufacturing assembly and in place to permit manufacturing operations to be performed on the cells while they are being transported or held in the cartridge halves as trays, with the subsequent closing and sealing of the two halves as a final enclosing housing for the cells, simplifies the manufacturing operation, reduces the number of otherwise necessary manual operations, and greatly reduces the cost of the final product. Moreover, the quality of the final product will be uniform and optimum, insofar as the assembled positions and relative arrangement of the cells constitute factors in proper assembly and operation of the cells as a complete battery.

That feature of the invention, involving the use of one half of the molded cartridge for supporting the cells as assembled therein, as a carrier to permit manufacturing operations on the cells, guides each cell to be seated in a receiving pocket in the half shell so as to expose sufficient area of a top plate terminal area on each of the cells, to permit access to such exposed area with a small double-pronged spot-welding tool to enable welding operations to be easily performed on the cells after they are placed in their respective pockets.

The front cell in the sequence of cells in the battery, is provided with a larger terminal strip that is welded to the top of the front cell, and that larger strip extends backward and outward through an appropriate slot in the adjacent wall of the cartridge shell, and that strip is suitably held down to the side surface of the cartridge shell to serve as a sliding contact when inserted into a receiving compartment for electrical contact.

The final cell in the sequence is disposed and supported in an end cavity of the cartridge with the cartridge wall cut away at the region to provide an opening through which the bottom surface of that final cell will extend outward through the cartridge and engage an appropriately disposed contact terminal in the receiving chambers for the cartridge.

The second half shell of the molded cartridge serves as a cover or closure, and is provided with similar cavities or pockets, appropriately dimensioned and disposed so that the second half shell of the cartridge may be folded over onto the first half shell of the cartridge already containing the cells, and the two cartridge half shells are then directed into proper fitting engagement by suitable locating pins on one cartridge half shell fitting into receiving holes on the other cartridge half shell.

Thus, when the cartridge is effectively closed and formed ready for use, one outer strip on the cartridge serves as one terminal for one end of the battery, and the exposed bottom surface of the end cell of the series serves as the other terminal for the other end of the battery. The battery is connected into an external circuit simply by being slipped into a cartridge-receiving space provided with two terminal contacts to be slidingly engaged by the two terminal surfaces of the cartridge battery.

The disposition of the respective cells and the construction of the molded cartridge half shells are described in more detail in the following description, taken together with the drawings, in which FIG. 1 is a pictorial view representing the cartridge shell when closed to serve as a housing for three cells as here employed to constitute a battery.

FIG. 3 is a sectional view of FIG. 2 taken along line 3—3 thereof showing the cylindrical cells in a spaced arrangement with a contact strip on the top surface of the first cell, and with a conducting intercell strip indicated between the first cell and a similar strip between the second and the third cell.

Figure 1:
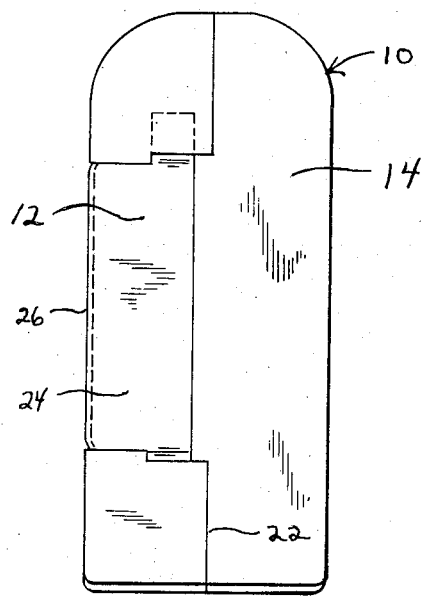
Figure 4:
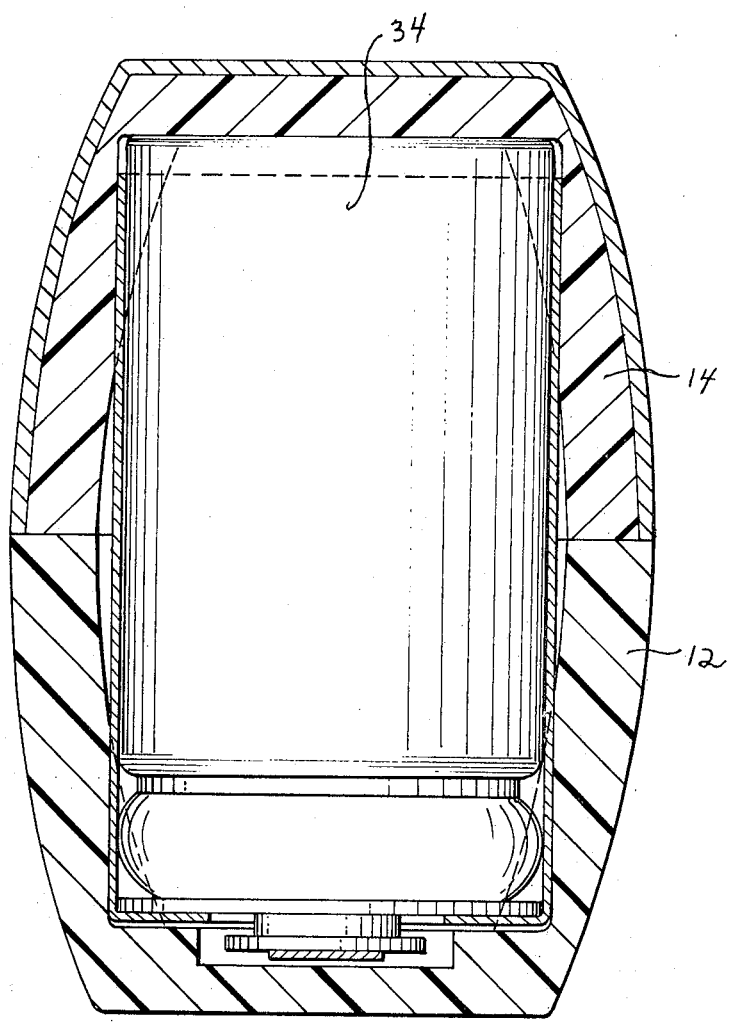
FIG. 4 is a sectional view of FIG. 2 taken along line 4—4 thereof.

Generally speaking, a molded battery casing is shown having a hallow peripheral shell with said peripheral shell having one end opening; an external terminal which extends through said end opening and which is engageable with one of the cells contained within said casing; a plurality of individual cells; a plurality of electrical connections between each of the cells to give a serial output voltage; and output terminal connectors including one of said cells for obtaining an output therefrom.

The cartridge 10 as shown in its final form with the cells inclosed therein are formed so they will fit together with the two cartridge half-shells, 12 and 14 will be closely fitted together along a parting plane 22 along which the two half shells 12 and 14 may be suitably bonded by an appropriate cemeting agent, or by a seal established by a suitable ultrasonic force.

In order that the cartridge may fit directly into a space fitted with terminal electrodes for an electric circuit, the cartridge (FIG. 3) is shown provided with a flat surface outer contact strip represented by a strip 24 of conducting material, which is shaped to be wrapped around the body of the cartridge 10 alongside the peripheral surface. To aid in holding the outer contact strip 24 in flat position on the surface 26 of the molded cartridge 10, the outer contact strip 24 is held down by one end element that extends up through a slot 28, and the other end of the outer contact strip 24 is held down by an end element that extends down through and is clinched under a slot 30 at the opposite end of the outer contact strip 24.

Figure 2:
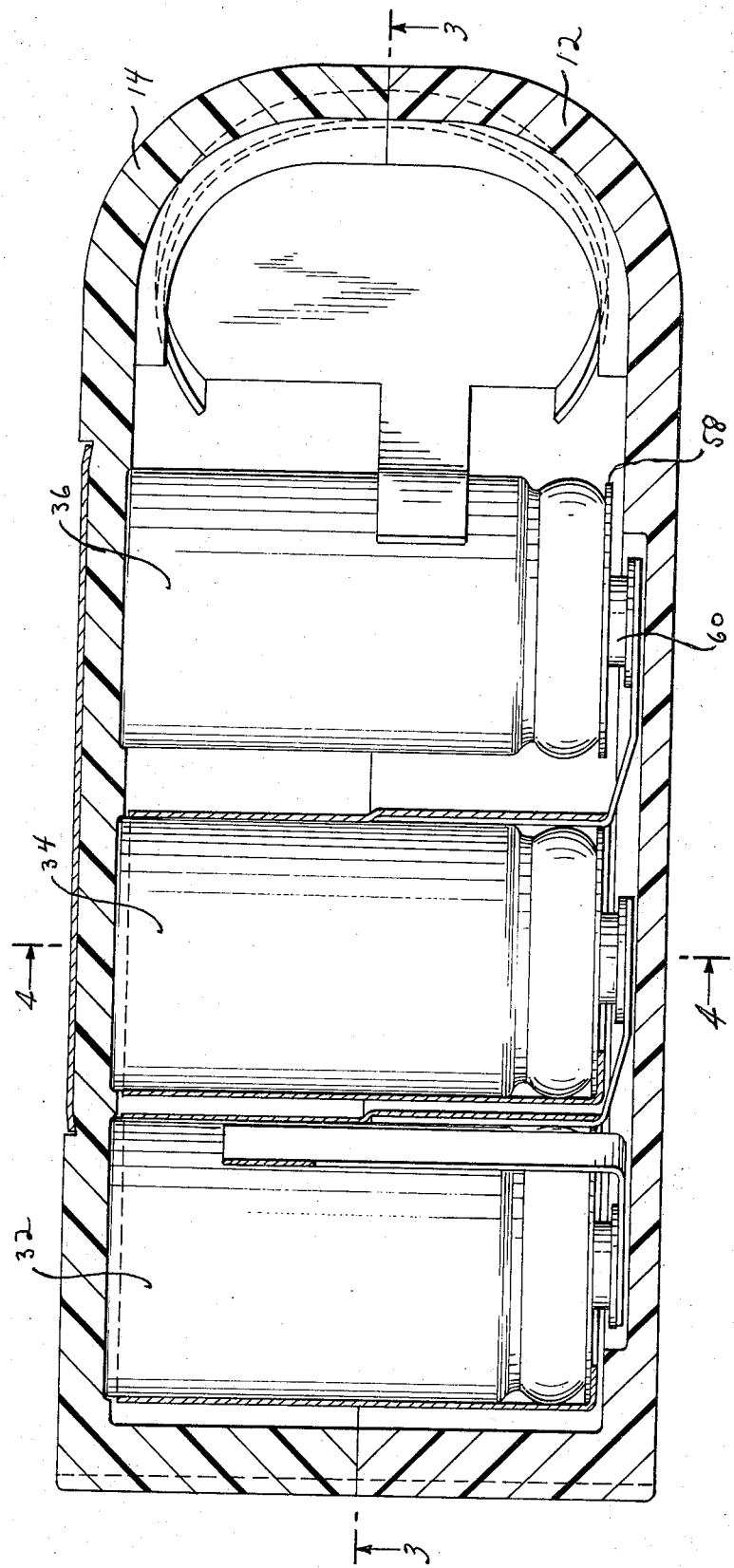
FIG. 2 is a cross-sectional view of the cartridge, with the three parallel cells already aligned in position in their pockets in the cartridge.

In FIG. 2, a cartridge with parallel arranged batteries is shown. Both shells 12 and 14 of the cartridge are shown joined by a hinge element. Three cells 32, 34 and 36 are shown positioned in the cartridge shell, in their respective pockets.

Figure 5:
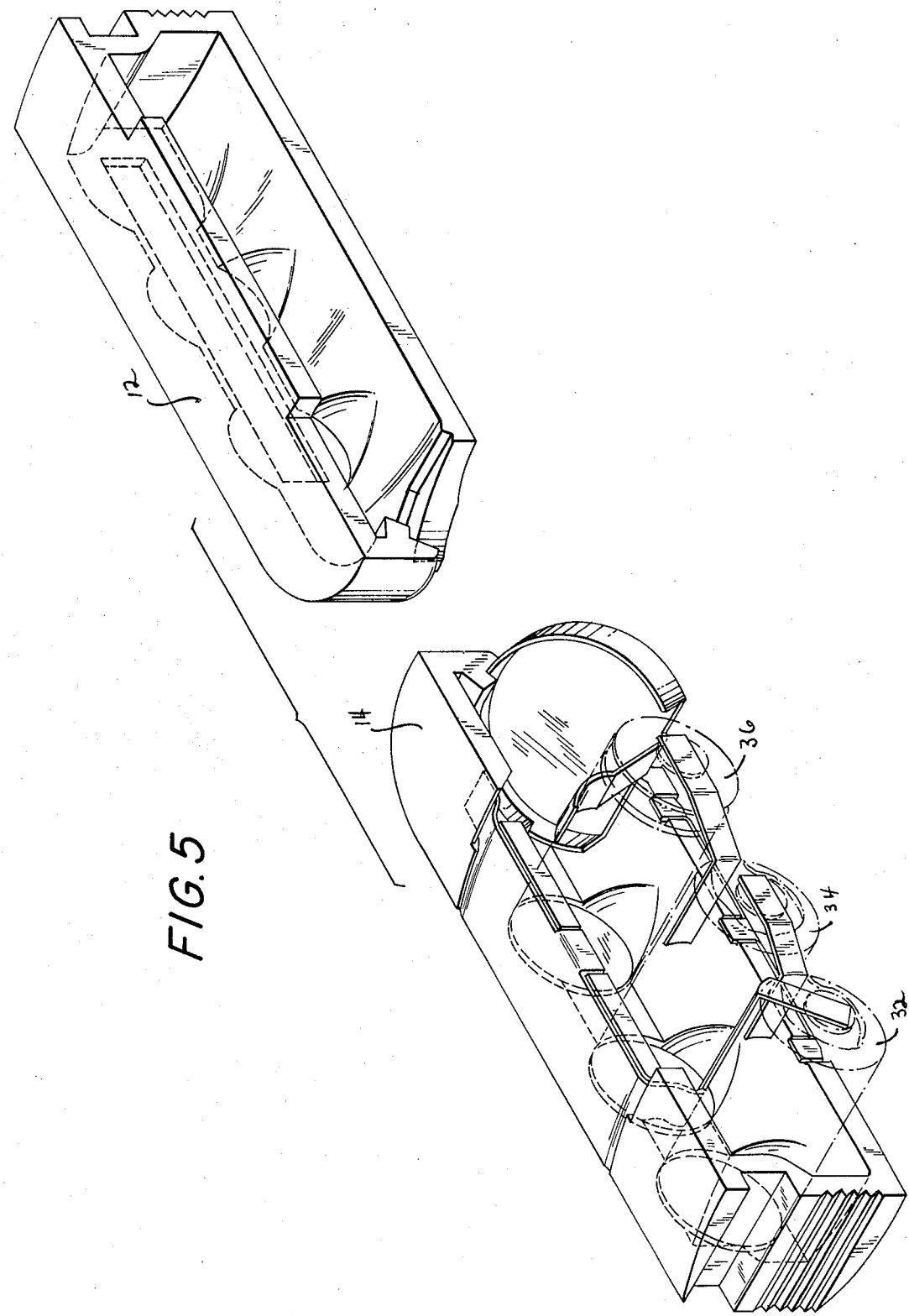
FIG. 5 is a pictorial elevational view, with the included cells positioned therein and which shows the parallel arrangement of at least some of the cells therein.

In order to better explain the electrical connections between the three cells 32, 34 and 36, to function as a battery, reference is made to FIGS. 2 and 5 in which the three cells 32, 34 and 36 are shown schematically, and relatively separated, and parallel in a manner to illustrate or imply how a conductive intercell connecting strip is welded at one end to the bottom terminal surface of the can of first cell 32, and then extends in assembly in the direction of the top terminal surface of the cell 34, to be there welded for good electrical connection, according to one of the features of this invention.

In similar manner, an intercell connecting strip that is welded at one end to the bottom terminal surface of second or middle cell 34 extends over to the top terminal surface of the cell 36.

The third cell 36 is not provided with a bottom conducting or terminal tab. Instead, there is provided a C-ring attached to the surface of cell 36 and extends outward through an opening in the rear end wall of the cartridge shell, as indicated more clearly in FIGS. 2 and 3, and engages, if desired a flat cell placed in an off set relationship thereto. The combination of parallel cylindrical cells and a flat cell indicates the versatility of the construction.

The three cells 32, 34 and 36 are cylindrically similar in construction. Each cell is alkaline: The flat cell shown in the drawings has an outer cathode can or casing whose bottom surface constitutes a terminal surface of differing polarity for the cell.

As shown, the top of each cell 32, 34 and 36 has a peripheral rim edge 58 of the individual can at one polarity, and its top terminal plate of opposite polarity, both separated by insulation 60. Since each intercell strip crosses over a region of insulation of each cell, where the intercell strip could engage the rim edge and the related terminal plates of cells 34 or 36, each of these two cells must be safeguarded against possible short-circuiting by an associated intercell connecting strip. To assure such safeguarding, each intercell strip is held in position to prevent the strip from engaging the rim edge of the cell to whose top terminal plate, the strip is welded or to be welded.

Thus, this invention discloses a molded casing, here shown as in two parts, of which one part may serve as an assembly tray during manufacture to assemble and permit electrical interconnection of the three cells, after which the second part of the molded casing is placed as a cover on the tray with the cells, and both parts then secured to constitute a closed sealed casing for the multi cell battery capable of being made to include a mixture of cylindrical and flat cells to a desired output and space. An appropriate terminal is wrapped around one portion of the cylindrical case of the cell and allowed egress through the open end of the casing. Thus, a terminal surface of the cell at the other end of the battery is exposed through an opening in a wall of the closed housing for connection to an external circuit. This feature of utilizing part of the final housing as a working tray during manufacture, assures economy in the manufacturing and assembly operation, due to the minimum of manual operations.

The construction which permits disposing half of each cell in its pocket, while exposing a substantial area of the top terminal surface, permits welding the intercell tabs to those exposed top terminal areas as simple operating steps during manufacture, which is one of the important features of this invention.

Provisions may be made by bosses to raise the intercell tabs to prevent short-circuiting a cell, and having top bosses for pressing the ends of those tabs into contact ready for welding to the top terminal surface of the related cell assures non-short-circuiting during assembly and thereafter, and at the same time holds the tabs in proper position for welding without further manual intervention.

Various modifications may be made in the structural details to achieve those same features, without departing from the spirit and scope of the invention.

What is claimed is:

1. A hollow battery cartridge comprising a duality of thin walled plastic shells, said shells including therewithin a multiplicity of complete cylindrical electrochemical cells, each placed in upright electrically insulated arrangement one adjacent the other along the horizontal axis of said cartridge, said shells mating along said horizontal axial plane and being bonded to form a substantially unitary peripheral cartridge containing said cells in the open volume of its hollow body, said hollow unitary shell having a first end and second cut-out end disposed opposite to said first end, means for internally electrically connecting said multiplicity of separate adjacent cells in a predetermined electrical voltage relationship one to the other to provide a determined cumulative voltage output from the battery, said electrical connecting means then passing through said first end of said hollow cartridge, a strip electrical connector lying flat and extending along the outside surface of said cartridge, said flat strip connector being integrally joined to said included cells by means of said electrical means passing through said first end, and a second electrical terminal connection made to said cells via said cut-out end of said cartridge, said terminal connection including a C ring placed about one of the electric cells, whereby all cylindrical and intermixed flat type cells forming a predetermined voltage may be handled as a unitary battery for use in associated electrical equipment.

References Cited

UNITED STATES PATENTS

| 3,660,169 | 5/1972 | Clune et al. | 136—111 |
| 3,537,909 | 11/1970 | Horton | 136—173 |
| 2,886,623 | 5/1959 | Lehr | 136—173 |

FOREIGN PATENTS

| 93,522 | 5/1962 | Denmark | 136—173 |

ANTHONY SKAPARS, Primary Examiner.

U.S. Cl. X.R.

136—111, 166, 173